United States Patent [19]
Kumar et al.

[11] Patent Number: 5,963,664
[45] Date of Patent: Oct. 5, 1999

[54] METHOD AND SYSTEM FOR IMAGE COMBINATION USING A PARALLAX-BASED TECHNIQUE

[75] Inventors: Rakesh Kumar, Dayton; Keith James Hanna, Princeton; James R. Bergen, Hopewell; Padmanabhan Anandan, Lawrenceville; Michal Irani, Princeton Jct., all of N.J.

[73] Assignee: Sarnoff Corporation, Princeton, N.J.

[21] Appl. No.: 08/493,632

[22] Filed: Jun. 22, 1995

[51] Int. Cl.$^6$ .............................. G06K 9/60; G06T 17/00
[52] U.S. Cl. .......................... 382/154; 382/284; 382/294; 348/47
[58] Field of Search .................................. 382/284, 294, 382/154, 42, 47, 48

[56] References Cited

U.S. PATENT DOCUMENTS

| | | | |
|---|---|---|---|
| 4,797,942 | 1/1989 | Burt | 382/284 |
| 5,187,754 | 2/1993 | Currin et al. | 382/284 |
| 5,202,928 | 4/1993 | Tomita et al. | 382/154 |
| 5,530,774 | 6/1996 | Fogel | 382/154 |
| 5,550,937 | 8/1996 | Bell et al. | 382/293 |
| 5,568,384 | 10/1996 | Robb et al. | 382/154 |
| 5,682,198 | 10/1997 | Katayawa et al. | 348/47 |

OTHER PUBLICATIONS

Bergen et al., "Hierarchical Model–Based Motion Estimation", Proceedings of European Conference on Computer Vision–92, Springer–Verlag (1992).

K.J. Hanna, "Direct Multi–Resolution Estimation of Ego–Motion and Structure From Motion", Proc. IEEE Workshop on Visual Motion, Princeton, New Jersey, Oct. 7–9, 1991, pp. 156–162.

Hanna et al., "Combining Stereo and Motion Analysis for Direct Estimation of Scene Structure", Proc. Fourth Int. Conf. on Computer Vision (ICCV'93), Berlin, Germany, May 1993.

Proceedings of the Second IEEE Workshop on Applications of Computer Vision, Dec. 5, 1994, R. Szeliski, "Image Mosaicing for Tele–Reality Applications," pp. 44–53.

Proceedings Fourth International Conference on Computer Vision, May 11, 1993, R. Cipolla et al., "Robust Structure From Motion Using Motion Parallax," pp. 374–382.

Proceedings of the 1994 IEEE Workshop on Motion of Non–Rigid and Articulated Objects, Nov. 11, 1994, H.S. Sawhney, "Simplifying Multiple Motion and Structure Analysis Using Planar Parallax and Image Warping," pp. 104–109.

IBC 94, International Broadcasting Convention, Sep. 16, 1994, K. Haseba et al., "Real–Time Composing System of a Real Camera Image and a Computer Graphic Image," pp. 656–660.

Proceedings IEEE Workshop on Representation of Visual Scenes, Jun. 24, 1995, R. Szeliski et al., "Direct Methods for Visual Scene Reconstruction," pp. 26–33.

(List continued on next page.)

*Primary Examiner*—Jon Chang
*Attorney, Agent, or Firm*—William J. Burke

[57] ABSTRACT

A system for generating three-dimensional mosaics from a plurality of input images representing an imaged scene. The plurality input images contain at least two images of a single scene, where at least two of the images have overlapping regions. The system combines the images using a parallax-based approach that generates a three-dimensional mosaic comprising an image mosaic representing a panoramic view of the scene and a shape mosaic representing the three dimensional geometry of the scene. Specifically, in one embodiment, the system registers the input images along a parametric surface within the imaged scene and derives translation vectors useful in aligning the images into a two-dimensional image mosaic. Once registered, the system generates a shape mosaic representing objects within the scene.

53 Claims, 9 Drawing Sheets

OTHER PUBLICATIONS

Proceedings of the Second IEEE Workshop on Applications of Computer Vision, Dec. 5, 1994, M. Hansen et al., "Real-Time Scene Stabilization and Mosaic Construction," pp. 54–62.

International Search Report, International Application No. PCT/US96/10485, mailed Sep. 16, 1996.

Szdiski and Coughlin, "Hierarchical Spline–Based Image Registration," Proceedings 1994 IEEE Computer Society Conference on Computer Vision and Patt. Rec., pp. 194–201, Jun. 21, 1994.

Kumar et al. "Framdess Registration of MR and CT 3D Volumetric Data Sets," Proceedings of $2^{nd}$ IEEE Workshop on Applications of Computer Vision, pp. 240–248, Dec. 1994.

Kumar et al. "Direct Recovery of Shape from Multiple Views: a Parallax Based Approach", Proc. 12th Int. Conf. on Pattern Recognition, pp. 685–688, Oct. 9, 1994.

Sauhney et al. "Model Based 2D & 3D Dominant Motion Estimation for Mosaicing and Video Representation," Proc. IEEE Int. Conf. on Computer Vision, pp. 583–590, Jun. 20, 1995.

METHOD AND SYSTEM FOR IMAGE COMBINATION USING A PARALLAX-BASED TECHNIQUE

The invention relates to image processing systems, and more particularly, the invention relates to an image processing system that combines multiple images into a mosaic using a parallax-based technique.

BACKGROUND OF THE DISCLOSURE

Until recently, image processing systems have generally processed images, such as frames of video, still photographs, and the like, on an individual, image-by-image basis. Each individual frame or photograph is typically processed by filtering, warping, and applying various parametric transformations. In order to form a panoramic view of the scene, the individual images are combined to form a two-dimensional mosaic, i.e., an image that contains a plurality of individual images. Additional image processing is performed on the mosaic to ensure that the seams between the images are invisible such that the mosaic looks like a single large image.

The alignment of the images and the additional processing to remove seams is typically accomplished manually by a technician using a computer workstation, i.e., the image alignment and combination processes are computer aided. In such computer aided image processing systems, the technician manually selects processed images, manually aligns those images, and a computer applies various image combining processes to the images to remove any seams or gaps between the images. Manipulation of the images is typically accomplished using various computer input devices such as a mouse, trackball, keyboard and the like. Since manual mosaic generation is costly, those skilled in the art have developed automated systems for generating image mosaics.

In automated systems for constructing mosaics, the information within a mosaic is generally expressed as two-dimensional motion fields. The motion is represented as a planar motion field, e.g., an affine or projective motion field. Such a system is disclosed in U.S. patent application Ser. No. 08/339,491, entitled "Mosaic Based Image Processing System", filed Nov. 14, 1994 now U.S. Pat. No. 5,649, 032, and herein incorporated by reference. The image processing approach disclosed in the '491 application automatically combines multiple image frames into one or more two-dimensional mosaics. However, that system does not account for parallax motion that may cause errors in the displacement fields representing motion in the mosaic.

In other types of image processing systems, multiple images are analyzed in order to recover photogrammatic information such as relative orientation estimation, range map recovery and the like without generating a mosaic. These image analysis techniques assume that the internal camera parameters (e.g., focal length pixel resolution, aspect ratio, and image center) are known. In automated image processing systems that use alignment and photogrammetry, the alignment and photogrammatic process involves two steps: (1) establishing correspondence between pixels within various images via some form of area- or feature-based matching scheme, and (2) analyzing pixel displacement in order to recover three-dimensional scene information.

Other image processing systems have analyzed image motion within a three-dimensional scene that is imaged from multiple viewpoints to determine the range or depth of objects within the scene. Such an approach is disclosed in K. J. Hanna, "Direct Multi-Resolution Estimation of Ego-Motion and Structure From Motion", Proceedings of the IEEE Workshop on Visual Motion, Princeton, N.J., Oct. 7–9, 1991, pp. 156–162, and K. J. Hanna et al., "Combining Stereo and Motion Analysis for Direct Estimation of Scene Structure", Proceedings of the Fourth International Conference on Computer Vision (ICCV'93), Berlin, Germany, May, 1993. The disclosures within both these papers are incorporated herein by reference. The prior art methods of generating three-dimensional representations have heretofore not been used in conjunction with systems that generate two-dimensional mosaics. Consequently, these approaches are used to analyze the three-dimensional geometry of a scene, but do not form useful representations of combinations of images such as mosaics.

Therefore, a need exists in the art for a system that automatically generates, from a plurality of images, a three-dimensional mosaic that accurately represents both the two-dimensional image information and the three-dimensional geometry within a scene.

SUMMARY OF THE INVENTION

The disadvantages associated with the prior art are overcome by the present invention of a system for generating three-dimensional mosaics from a plurality of input images. The plurality input images contain at least two images of a single scene, where at least two of the images have overlapping regions but, in general, depict the scene from differing viewpoints. The input images are generated by either a single camera producing a series of video frames or a plurality of cameras generating still or video frames from differing viewpoints of the same scene. In either case, the input images to the system are digital images that are either digitized by the camera or digitized after the camera generates the image. The system combines the input images using a parallax-based approach that generates a three-dimensional mosaic comprising an image mosaic representing a panoramic view of the scene and a shape mosaic representing the three-dimensional geometry of the scene. From this three-dimensional mosaic, any viewpoint of the scene can be synthetically derived, i.e., viewpoints that are not collocated with the camera(s) that originally imaged the scene. Furthermore, such a three-dimensional mosaic can be used to estimate object height within the imaged scene as well as be used for efficient compression of video information for transmission or storage.

More specifically, the system generates the three-dimensional mosaic using a sequence of image processing techniques. First, the images and any existing three-dimensional mosaic into which the images are to be incorporated are subsampled to form conventional multi-resolutional image pyramids. Then, the system uses a sequential image registration process dubbed a plane-then-parallax (P-then-P) process to compute image alignment parameters and the parallax motion that exists between images. Lastly, the full alignment and parallax field generation is achieved using a simultaneous image registration process dubbed a plane-and-parallax (P-and-P) process. After each step of processing, the degree of image alignment is monitored such that, if accurate alignment is attained, subsequent processing is avoided. In the broadest use of the invention, either P-then-P or P-and-P processing can be used alone to register the images. These image registration processes compute both alignment and motion parameters (e.g., translation parameters for alignment and both a parallax field and a planar motion field for motion estimation) that are useful for aligning images to generate an image mosaic and for capturing the three-dimensional geometry of the scene to generate a shape mosaic. As such, the result of the registration processes can be used to generate a three-dimensional mosaic containing a two-dimensional image mosaic and a shape mosaic. From the information contained in the three-dimensional mosaic, a synthetic viewpoint of the scene can be generated that would take into account any parallax within the scene to produce a realistic view. The system uses pose estimation processing of the three-dimensional mosaic to achieve an image from the synthetic viewpoint. Also, the system contains a process for detecting occluded points in the scene such that these occluded points can be further processed to achieve a realistic synthetic image.

Such three-dimensional mosaics find use in estimating object height within a scene; in achieving efficient image and video compression, storage and retrieval; in detecting object motion or image changes without detecting parallax motion as an image change; as well as many other applications.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
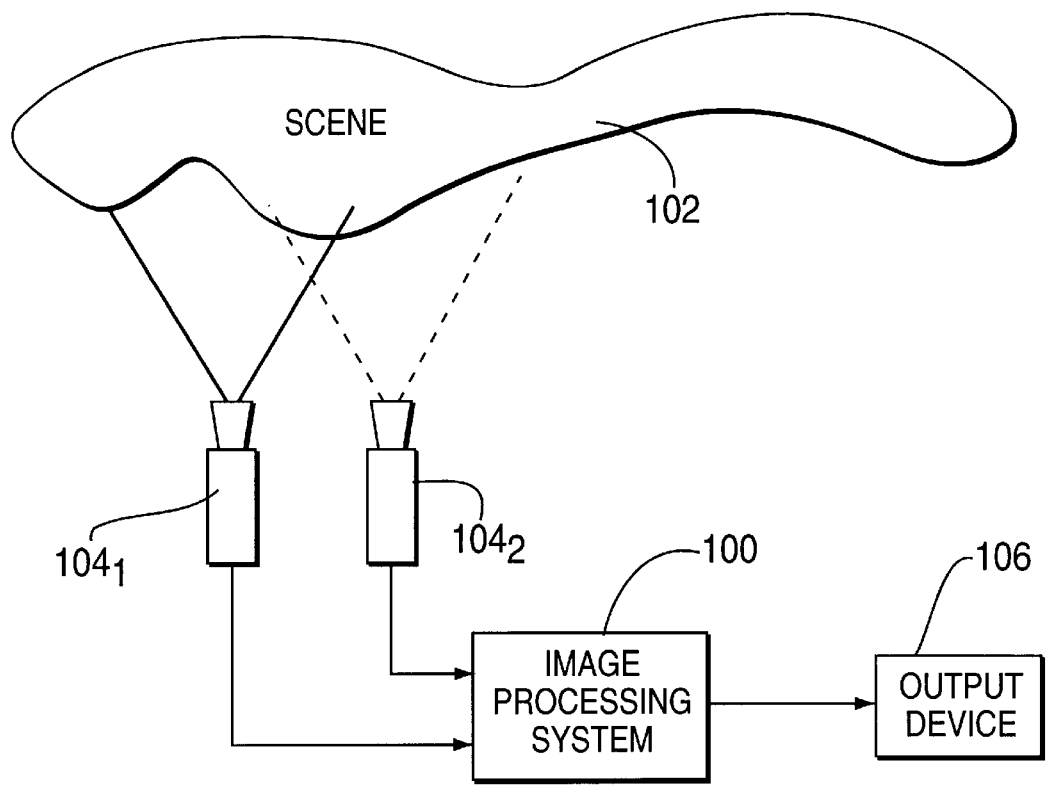
FIG. 1 depicts a block diagram of an imaging system incorporating an image processing system of the invention.

The present invention is an image processing system that combines a plurality of images representing an imaged scene to form a three-dimensional (3D) mosaic, where the 3D mosaic contains an image mosaic representing a panoramic view of the scene and a shape mosaic representing the three-dimensional geometry of the scene. The shape mosaic defines a relationship between any two images by a motion field that is decomposed into two-dimensional image motion of a two-dimensional, parametric surface and a residual parallax field. Although many techniques may be useful in generating the motion fields and the parametric translation parameters, the following disclosure discusses two illustrative processes. The first process, known as plane-then-parallax (P-then-P), initially registers the images along a parametric surface (plane) in the scene and then determines a parallax field representing the three-dimensional geometry of the scene. The second illustrative process, known as plane-and-parallax (P-and-P), simultaneously registers the images and determines the parallax field. With either process, the results of registration are translation parameters for achieving image alignment along the parametric surface, a parallax field representing the three-dimensional geometry (motion) of the scene with respect to the parametric surface, and a planar motion field representing motion within the parametric surface. These results can be used to combine the input images to form a three-dimensional mosaic.

Image motion of a parametric surface is, in essence, a conventional representation of a 2D mosaic. Motion of the parametric surface is generally expressed as a parametric motion field that is estimated using one of the many available techniques for directly estimating two-dimensional motion fields. For an overview of such techniques, see Bergen at al., "Hierarchical Model-Based Motion Estimation," Proceedings 2nd European Conference on Computer Vision-92, Springer-Verlag, Santa Margherita Ligure, Italy, May 1992. Generally speaking, a direct approach is sufficient for aligning and combining a plurality of images to form a two-dimensional mosaic. Such a two-dimensional mosaic represents an alignment of a two-dimensional parametric surface within a scene captured by the image sequence. This parametric surface can either be an actual surface in the scene within which lie most objects of the scene or the parametric surface can be a virtual surface that is arbitrarily selected within the scene. All objects within the scene generate what is known as parallax motion as a camera moves with respect to the parametric surface. This parametric motion is represented by a parallax motion field (also referred to herein as a parallax field). The parallax field has value for objects within the scene that do not lie in the plane of the surface. Although objects lying in the plane of the surface are represented in the parallax field, those objects have zero parallax. More particularly, the parallax field represents the objects that lie in front of and behind the parametric surface and the distance (height) of these objects from the surface, i.e., the three-dimensional geometry of the scene. As such, using the parallax field in combination with the parametric surface and its planar motion field, the system can generate a three-dimensional reconstruction of the scene up to an arbitrary collineation. If camera calibration parameters such as focal length and optical center are known, then this three-dimensional reconstruction of the scene is Euclidean.

FIG. 1 depicts a block diagram of the image processing system 100 as it is used to generate 3D mosaics from a plurality of images. The image processing system is, in general, a general purpose computer that is programmed to function as an image processing system as described herein. The system further contains one or more cameras $104_n$ that image a scene 102. In the illustrative system two cameras, cameras $104_1$ and $104_2$ are shown. Each camera, for simplicity, is assumed to be digital video camera that generates a series of frames of digitized video information. Alternatively, the cameras could be still cameras, conventional video cameras, or some other form of imaging sensor such as an infrared sensor, an ultrasonic sensor, and the like, whose output signal is separately digitized before the signal is used as an input to the image processing system 100. In any event, each camera $104_1$ and $104_2$ generates an image having a distinct view of the scene. Specifically, the images could be selected frames from each camera imaging a different view of the scene or the images could be a series of frames from a single camera as the camera pans across the scene. In either case, the input signal to the image processing system of the present invention is at least two images taken from different viewpoints of a single scene. Each of the images partially overlaps the scene depicted in at least one other image. The image processing system 100 combines the images into a 3D mosaic and presents the mosaic to an output device 106. The output device could be a video compression system, a video storage and retrieval system, or some other application for the 3D mosaic.

Figure 2:
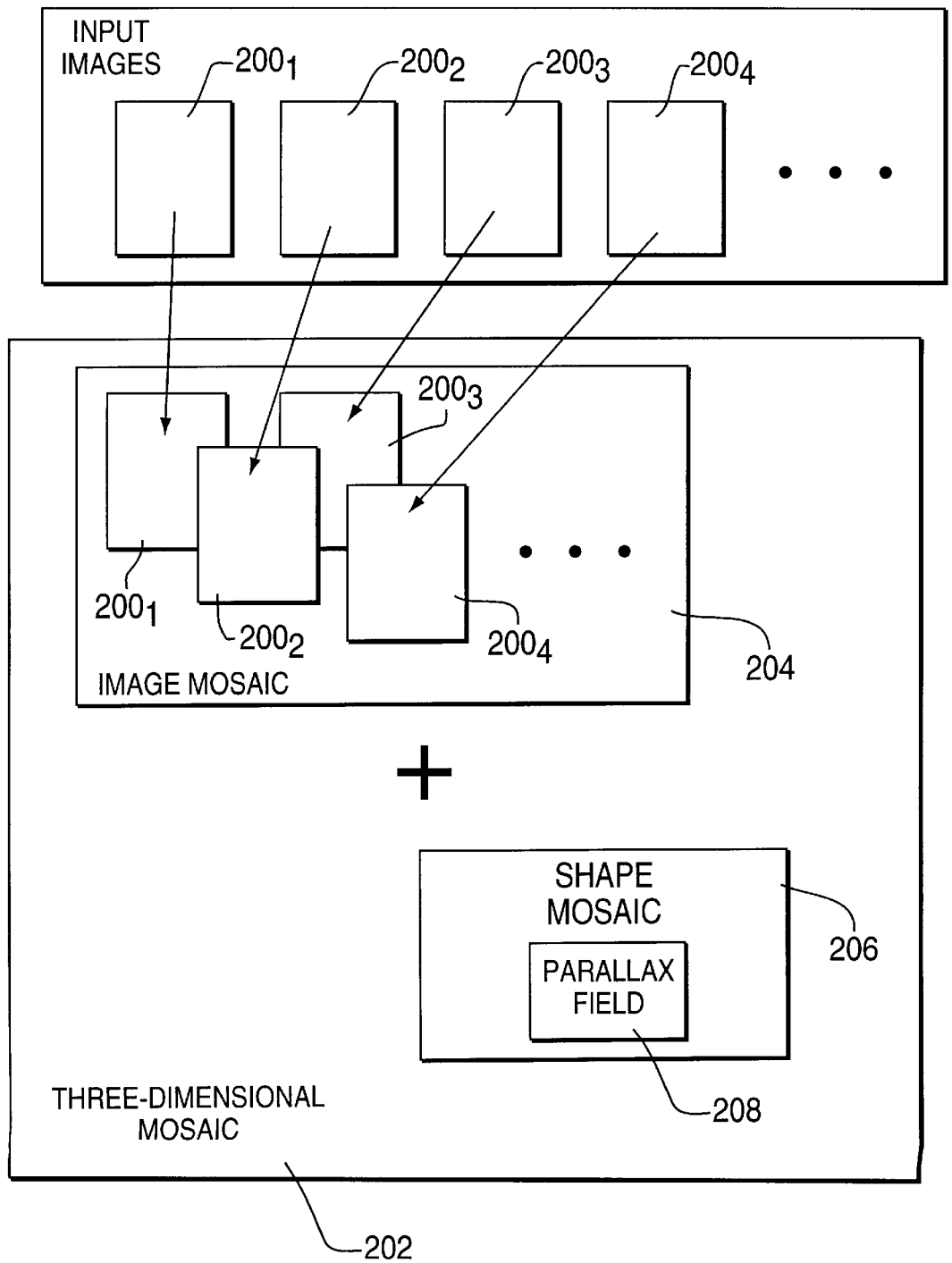
FIG. 2 schematically depicts the input images and output mosaics of the system of FIG. 1.

FIG. 2 schematically depicts the input images $200_n$ to the system of FIG. 1 and the output 3D mosaic 202 generated by that system in response to the input images. The input images, as mentioned above, are a series of images of a scene, where each image depicts the scene from a different viewpoint. The system aligns the images and combines them to form an image mosaic 204, e.g., a two-dimensional mosaic having the images aligned along an arbitrary parametric surface extending through all the images. Aligning the images to form the image mosaic requires both the parametric translation parameters and the planar motion field. In addition to the image mosaic, the system generates a shape mosaic 206 that contains the motion field that relates the three-dimensional objects within the images to one another and to the parametric surface. The shape mosaic contains a parallax motion field 208. The planar motion field represents motion within the parametric surface that appears in the images from image to image, while the parallax flow field represents motion due to parallax of three-dimensional objects in the scene with respect to the parametric surface.

A. Determining A Residual Parallax Field

Consider two camera views, one denoted as the "reference" camera and the other denoted the "inspection" camera (e.g., respectively cameras $104_1$ and $104_2$ of FIG. 1). In general, the image processing system maps any three-dimensional (3D) point $\vec{P}_1$ in the reference camera coordinate system to a 3D point $\vec{P}_2$ in the inspection camera coordinate system using a rigid body transformation represented by Equation 1.

$$\vec{P}_2 = R(\vec{P}_1) + \vec{T}_2 = R(\vec{P}_1 - \vec{T}_1) \qquad (1)$$

The mapping vector is represented by a rotation (R) followed by a translation ($\vec{T}_2$) or by a translation ($\vec{T}_1$) followed by a rotation (R). Using perspective projection, the image coordinates (x,y) of a projected point P are given by the vector $\vec{p}$ of Equation 2.

$$\vec{p} = \begin{bmatrix} x \\ y \\ z \end{bmatrix} = \frac{f}{P_z} P \qquad (2)$$

where f is the focal length of the camera.

Figure 3:
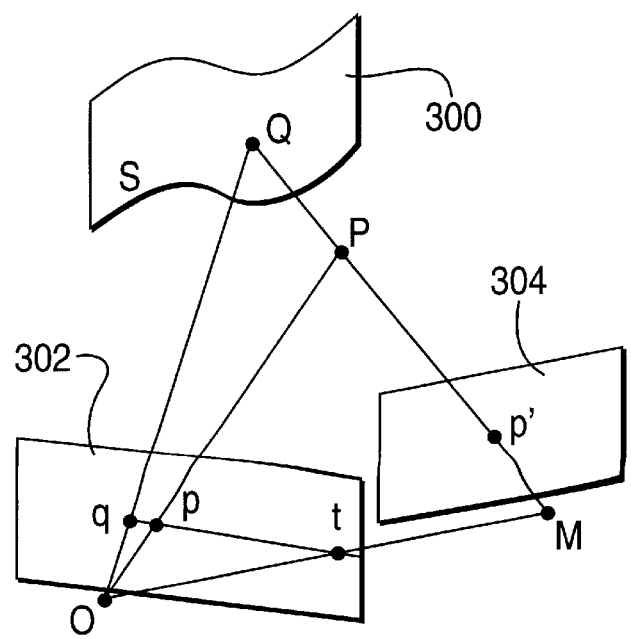
FIG. 3 is a geometric representation of the relationship amongst a reference image generated by a reference camera, an inspection image generated by an inspection camera, and an arbitrary parametric surface within a scene imaged by the cameras.

FIG. 3 is a geometric representation of the relationship amongst a reference image 302 generated by the reference camera, an inspection image 304 generated by the inspection camera, and an arbitrary parametric surface 300 within the imaged scene. Let S denote the surface of interest (a real or virtual parametric surface 300), P denotes an environmental point (e.g., a location of an object) within the scene that is not located on S, and O and M denote the center locations (focal points) of each camera. The image of P on the reference view 302 is p. Let the ray MP intersect the surface S at location Q. A conventional warping process, used to align the images 302 and 304 by aligning all points on the surface S, warps p', the image of P on the inspection image 304, to q, the image of Q on the reference image 302. Therefore, the residual parallax vector is pq, which is the image of line PQ. It is immediately obvious from the figure that vector pq lies on the plane OMP, which is the epipolar plane passing through p. Since such a vector is generated for any point P in the scene, it can be said that the collection of all parallax vectors forms a parallax displacement field. Since the parallax displacement vector associated with each image point lies along the epipolar plane associated with that image, the vector is referred to as an epipolar field. This field has a radial structure, each vector appearing to emanate from a common origin in the image dubbed the "epipole" (alias focus of expansion (FOE)). In FIG. 3 the epipole is located at point "t". From FIG. 3, it is obvious that the epipole t lies at the intersection of the line OM with the image plane 302. The parallax displacement field is also referred to herein simply as a parallax field or parallax motion field.

In determining the residual parallax information (e.g., parallax field), it is assumed that the two images are aligned (registered) along the parametric surface using a conventional parametric motion estimation method. These alignment methods are also known in the art as "hierarchical direct methods" of alignment or registration. One such method is described in commonly assigned U.S. patent application Ser. No. 08/339,491, entitled "Mosaic Based Image Processing System", filed Nov. 14, 1994 and herein incorporated by reference. As shall be discussed in detail below, once the inventive system determines the transformation and planar motion field for aligning the two images along the parametric surface, the system determines the residual parallax information representing the height, above or below, the parametric surface of objects within the scene.

B. Registration of Images

Using the general principles discussed above to accurately represent a three-dimensional scene, the system must recover both the planar and parallax motions as well as the translation parameters for aligning the images. Illustratively, the system uses two techniques either separately, or in sequence, to determine the transformation parameters and the motions within the images. The first technique is a "sequential registration" approach, in which a plane (parametric surface) within the scene that is imaged by both cameras is first registered using an eight parameter planar transformation. The residual parallax motion is then estimated using a separate, sequentially executed step. The second technique is a "simultaneous registration" approach, in which the system simultaneously estimates the parametric transformation as well as the planar and parallax motion fields.

i. Sequential Registration

Figure 4:
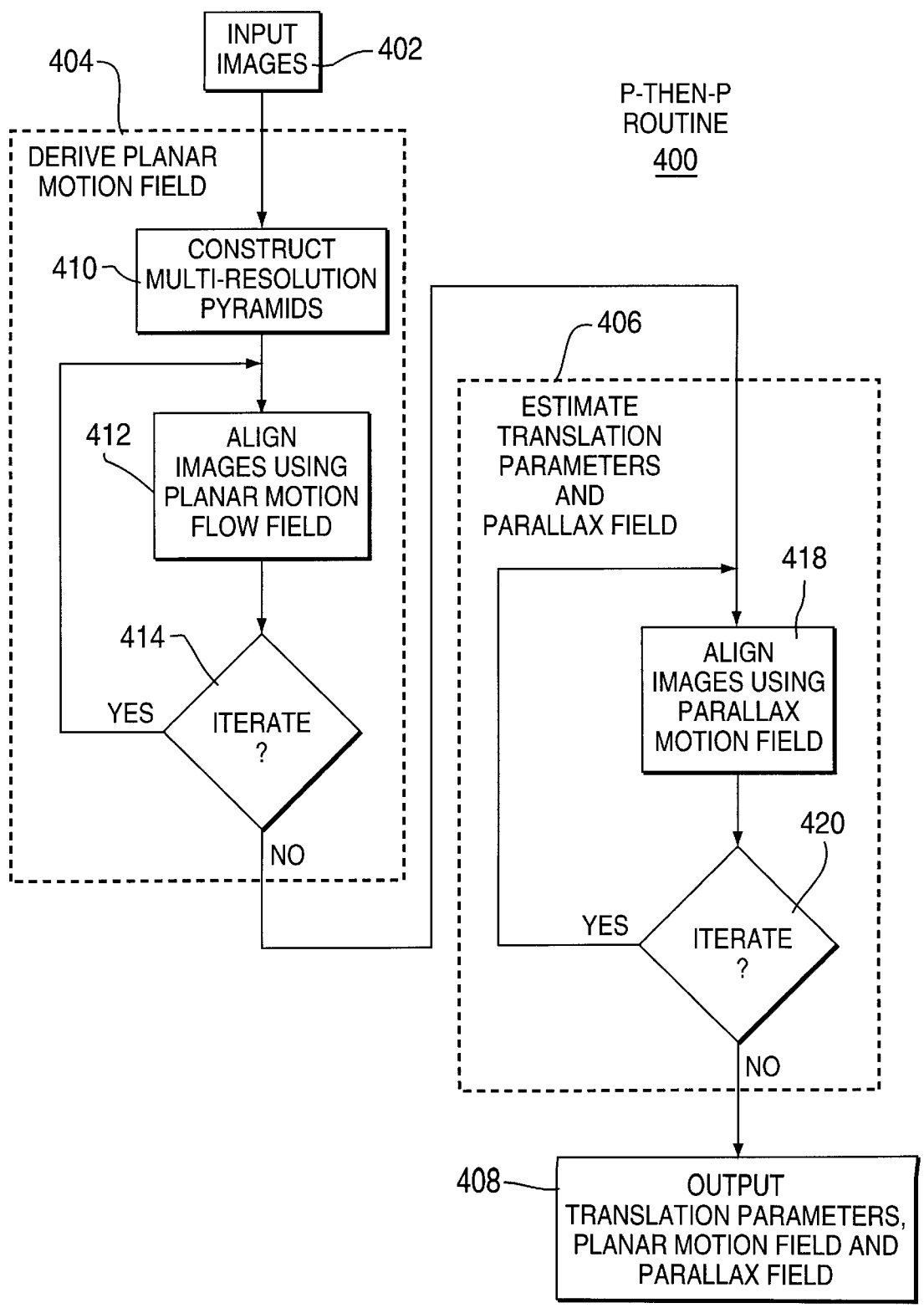
FIG. 4 is a flow chart of a P-then-P routine for registering images and extracting parallax information from the registered images.

FIG. 4 depicts a flow chart of a routine 400 executed by the system to perform sequential registration and determine the parallax field. To register a plane within the scene, the system uses a hierarchical direct registration technique described in Bergen et al., "Hierarchical Model-based Motion Estimation," Proceedings 2nd European Conference on Computer Vision, Springer-Verlang, Santa Margherita Ligure, Italy, May 1992. This technique uses a planar flow field model for motion within a plane. Once a plurality of images are input to the system at step 402, the routine performs two sequential steps to determine the translation parameters and the motion fields; namely, at step 404, the routine derives the planar motion fields and, at step 406, the routine estimates both the translation parameters and the parallax field. The resulting output 408 from the routine is the relational information regarding the input images, e.g., the translation parameters for aligning the images along a plane and the planar and parallax motion fields representing the three-dimensional geometry of the scene.

Specifically, the total motion vector of a point in the scene is expressed as the sum of the motion vectors due to the planar surface motion $(u_p,v_p)$ and the residual parallax motion $(u_r,v_r)$. As such, this motion vector is represented as Equation 3.

$$(u,v)=(u_p,u_v)+(u_r,v_r) \quad (3)$$

Further, the motion field of a planar surface (two-dimensional) is represented as:

$$u_p(x) = p_1 x + p_2 y + p_5 + p_7 x^2 + p_8 xy \quad (4)$$
$$v_p(x) = p_3 x + p_4 y + p_6 + p_7 xy + p_8 y^2$$

where $$\begin{bmatrix} p_1 \\ p_2 \\ p_3 \\ p_4 \\ p_5 \\ p_6 \\ p_7 \\ p_8 \end{bmatrix} = \begin{bmatrix} N_{2x}T_{2x} - N_{2z}T_{2z} \\ N_{2y}T_{2x} - \Omega_z \\ N_{2x}T_{2y} - \Omega_z \\ N_{2y}T_{2y} - N_{2z}T_{2z} \\ f(N_{2z}T_{2x} - \Omega_y) \\ f(N_{2z}T_{2x} - \Omega_x) \\ \frac{1}{f}(\Omega_y - N_{2x}T_{2z}) \\ \frac{1}{f}(-\Omega_x - N_{2y}T_{2z}) \end{bmatrix} \quad (5)$$

$T_{2x}$, $T_{2y}$, and $T_{2z}$ denotes the translation vector between camera views, $\Omega_x$, $\Omega_y$, and $\Omega_z$ denotes the angular-velocity vector, f denotes the focal length of the camera. and $N_{2x}$, $N_{2y}$, and $N_{2z}$ denotes the normal vector to the planar surface from a camera center. The residual parallax vector is further represented as:

$$u_r(x)=\gamma(fT_{2x}-xT_{2z})$$
$$v_r(x)=\gamma(fT_{2y}-yT_{2z}) \quad (6)$$

Where the parallax magnitude field is represented by Equation 7.

$$\gamma=H/P_zT_\perp \quad (7)$$

where H is the perpendicular distance of the point of interest from the plane, and $P_z$ is the depth of the point of interest (also referred to in the art as range). $T_\perp$ is the perpendicular distance from the center of the first camera (reference) to the plane, and f is the focal length of that camera. At each point in the image, the parallax magnitude field γ varies directly with the height of the corresponding 3D point from the reference surface and inversely with the depth of the point, i.e., the distance of the point from the camera center.

To determine the total motion field, the sequential approach first solves Equation 4 for $(u_p,v_p)$ and then Equation 3 for $(u_r,v_r)$. To achieve alignment in a coarse-to-fine, iterative manner, the input images are subsampled to form multi-resolutional image pyramids. Within each level of the pyramid, the measure used as indicia of an image alignment match is the sum of the squared difference (SSD) measure integrated over selected regions of interest on the images. Typically, the system initially selects the entirety of the images as the selected region and, thereafter, recursively selects smaller regions until the alignment measure is minimized. To perfect alignment, the alignment measure is minimized with respect to the quadratic flow field parameters (defined below). The SSD error measure for estimating the flow field within an image region is:

$$E(\{u\}) = \sum_x (I(x, t) - I(x - u(x), t - 1))^2 \quad (8)$$

where x=(x,y) denotes the spatial position of a point within an image, I is the multi-resolutional pyramid image intensity, and u(x)=(u(x,y),v(x,y)) denotes the image velocity at a point (x,y) within an image region and {u} denotes the entire motion field within the region. The motion field is modeled by a set of global and local parameters.

To use this technique, the system, at step 410, first constructs a multi-resolutional pyramid representation (e.g., Laplacian or Guassian pyramids) of each of the two input images. Thereafter, at step 412, the routine estimates, in a coarse-to-fine manner, the motion parameters that align the two images to one another, i.e., although not specifically shown, the routine iterates over the levels of the pyramids to achieve the coarse-to-fine alignment. Specifically, the routine aligns the images using the foregoing planar motion field computations and minimizing the SSD at each level of the image pyramids. The routine estimates the eight motion parameters ($p_1$ through $p_8$) and the resulting motion field with reference to a region within a planar surface comprising a substantial number of pixels in the two images (e.g., a "real" or physical surface). In particular, the routine begins with some initial parameter values (typically, zero) and then iterively refines the parameters in order to first minimize the SSD error at a coarse image resolution, then successively at finer image resolutions within the image pyramids. After each step of alignment iteration, the transformation based on the current set of parameters is applied to the inspection image in order to reduce the residual displacement between the two images. The reference and inspection images are registered so that the selected image region (e.g., the overlapping region in the physical plane) is aligned along a "visible" planar surface. The routine queries, at step 414, whether further computational iterations are necessary to achieve alignment. The decision is based on a comparison of the SSD to a predefined threshold SSD level. If further alignment is necessary the routine loops to step 412. Once the images are accurately registered, the routine proceeds from step 414 to step 406.

At step 406, the routine uses the planar flow field information to compute the translation parameters and the parallax field. At step 418, the value of $(u_p,v_p)$ as expressed in Equation 4 is computed using the estimated values of $p_1$ through $p_8$ computed in step 404. Then, the values of $(u_p,v_p)$ and the expression of $(u_r,v_r)$ in Equation 6 are substituted into the SSD function (Equation 8). Equation 8 is then minimized to solve for the direction translation $T_{2(x,y,z)}$ and the parallax vector field γ. The routine iterates from step 420 as the parameters are computed to minimize the SSD. Although not explicitly shown, the routine also iterates through the pyramid levels to achieve sufficient translation parameter accuracy. Once the SSD is minimized to a sufficient level, the routine generates, at step 408, as an output the translation parameters, the planar motion field, and the parallax motion field. Note that these values are generated using the various levels of image pyramids and, as such, these parameters and motion fields are generated as multi-resolutional pyramids. Thus, the parameter and motion field pyramids can be directly used to produce a multi-resolutional pyramid of the 3D mosaic.

The system generally uses this sequential registration process to align images that depict a scene containing a well-defined planar surface. The result of the process is a set of translation parameters for aligning the images along the plane to produce a 2D mosaic and a motion fields representing three-dimensional geometry in the scene. In other words, the system generates the parameters used to produce a 3D mosaic using a two step process: registration to a plane (step 404), then determine the parallax information (step 406). This two step process has been dubbed the plane-then-parallax (P-then-P) method.

ii. Simultaneous Registration

Figure 5:
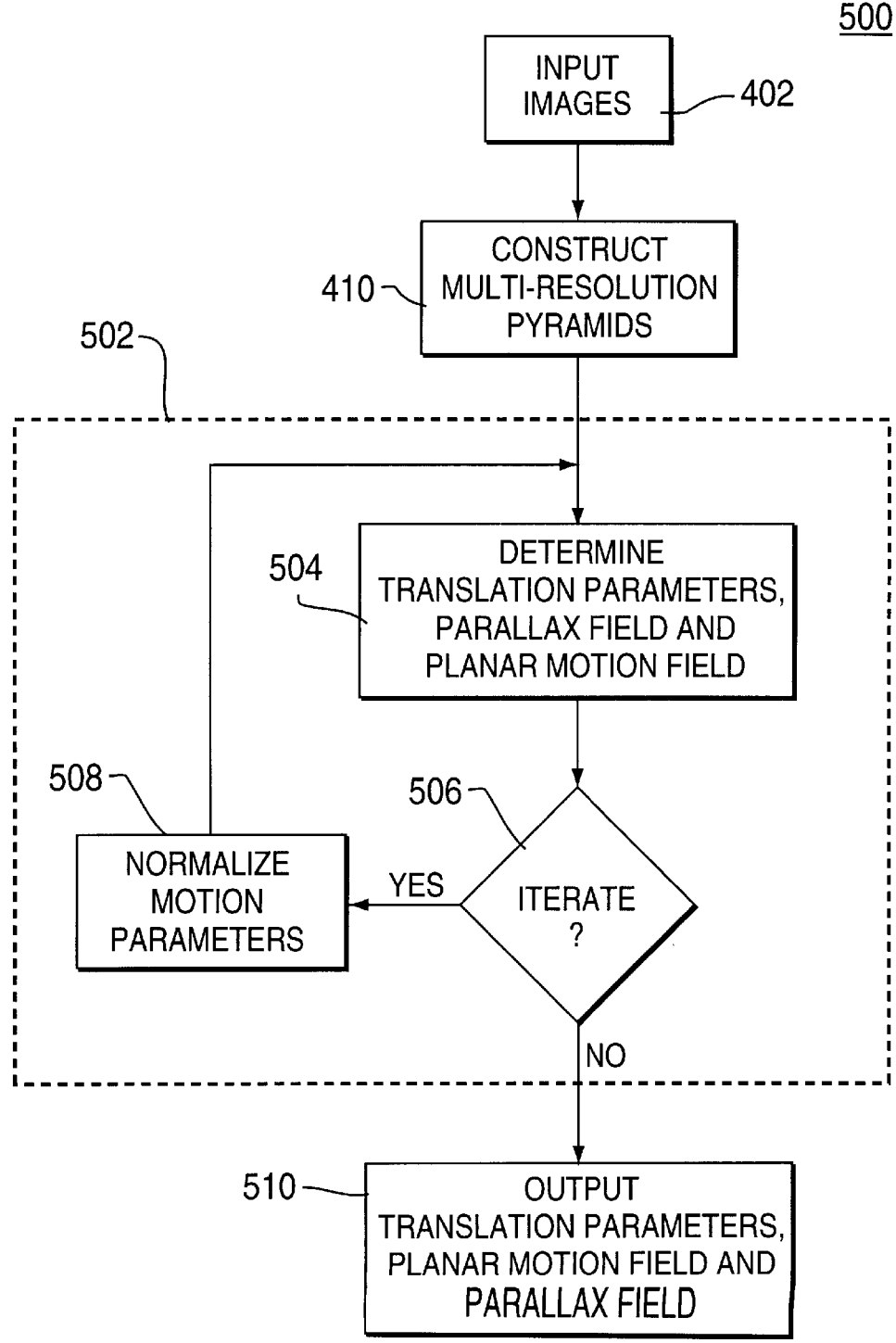
FIG. 5 is a flow chart of a P-and-P routine for registering images and extracting parallax information from the registered images.

FIG. 5 depicts a routine 500 for simultaneously registering two images and generating a parallax field. In the simultaneous registration approach, the system simultaneously solves for both $(u_p, v_p)$ and $(u_r, v_r)$ in the total motion vector as defined in Equations 3 and 6.

Using the simultaneous registration approach, a "real" planar surface is not necessary; thus, the images can be registered to a "virtual" planar surface lying arbitrarily within the images. As such, this approach is more flexible than the sequential registration approach.

Routine 500 begins in the same manner as routine 400, in that, steps 402 and 410 input images and then construct multi-resolutional pyramids therefrom. Thereafter, the routine, in step 504, computes the translation parameters, the planar motion field and the parallax field. The results are output in step 510.

More specifically, the expressions for (u,v) in Equations 3 and 4 are substituted into equation 5 to obtain a complete objective function. The resulting function is then minimized, in step 504, with respect to SSD to simultaneously solve for the planar motion parameters ($p_1$ through $p_8$), direction of translation $T_{2(x,y,z)}$, and the parallax field y at each level of the image pyramid. As such, this process is iterated using the multi-resolutional image pyramids in a coarse-to-fine fashion. Results obtained at the coarse level of the pyramid are used as an initial estimate for a computation at the next level. At each level of the pyramid, the computation is iterated to minimize SSD. However, the results at each iteration are stored to form a multi-resolutional pyramid of the computation results, i.e., the process forms multi-resolutional pyramids for the translation parameters and motion fields. After each iteration through step 506, the estimated motion parameters are normalized, at step 508, such that the planar registration parameters correspond to a virtual plane which gives rise to the smallest parallax field (e.g., the average plane of the 3D scene imaged by the two cameras). The result, generated at step 510, is a set of translation parameters for aligning the images along the plane to produce a 2D mosaic, a planar motion field representing motion with the plane, and a parallax vector field representing objects in the scene that do not lie in the plane. In other words, the system generates a 3D alignment using a one step process: simultaneous registration to a plane and determination of the parallax information. This one step process has been dubbed the plane-and-parallax (P-and-P) method.

iii. Combination of Sequential and Simultaneous Image Registration

Figure 6:
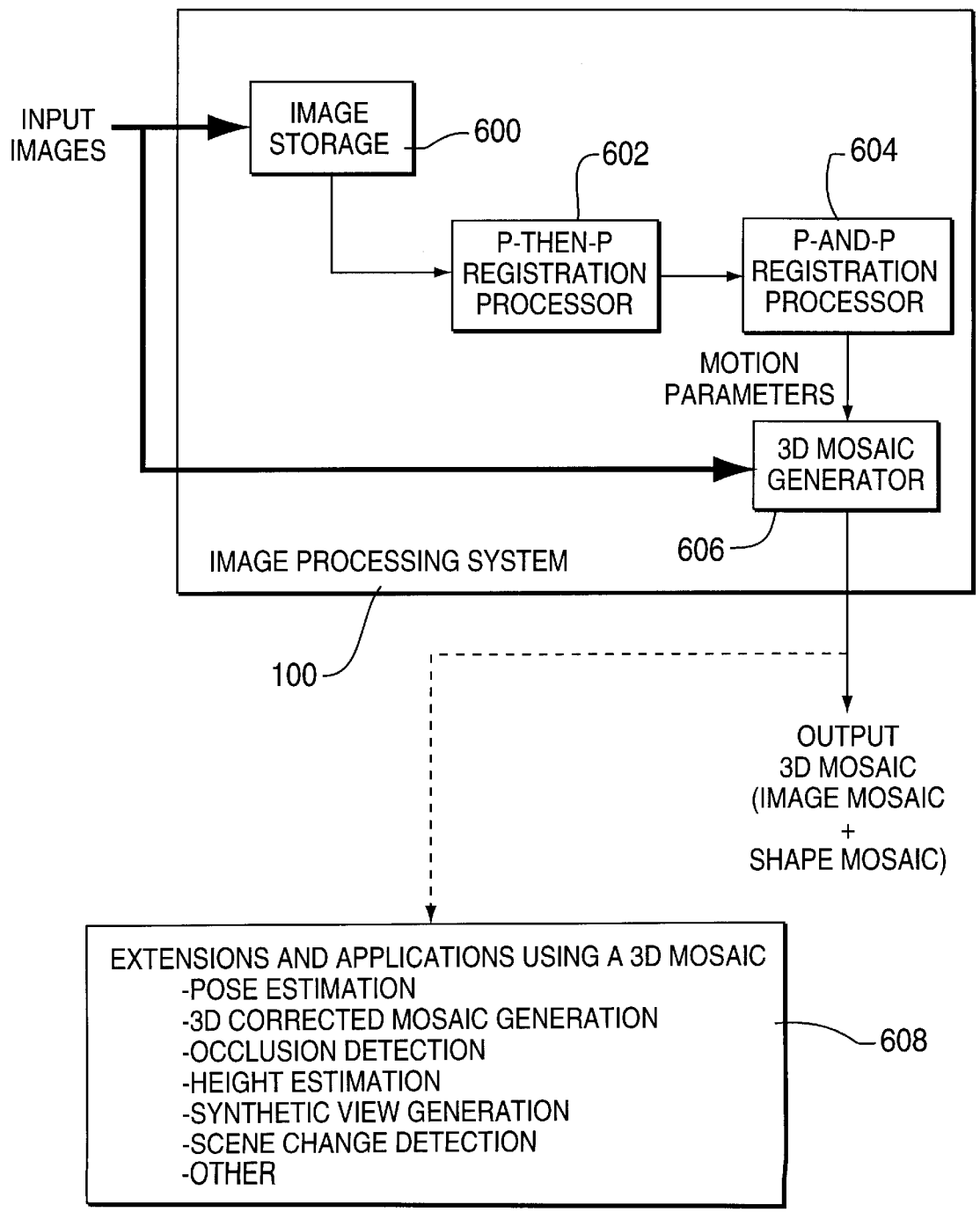
FIG. 6 is a functional block diagram of an image processing system of the present invention.

FIG. 6 depicts a functional block diagram of the image processing system 100 of the present invention. The input images are temporarily stored in image storage 600. First, the system 100 uses sequential registration to register the reference and inspection images and provide an estimate of the parallax field (P-then-P registration processor 602 operating in accordance with routine 400 of FIG. 4). Secondly, the system uses simultaneous registration to provide further image alignment and an accurate parallax field (P-and-P registration processor 604 operating in accordance with routine 500 of FIG. 5). If either processor 602 or 604 generates a flow field for the parametric surface that is deemed accurate to within a predefined measure of accuracy (e.g., a minimal SSD), the system ceases processing the images and begins generating a 3D mosaic. For example, in a scene containing simple shaped objects, the P-then-P processing may be enough to accurately generate a 3D mosaic of the scene. More complicated scenes having many parallax objects may require both forms of image processing to generate an accurate 3D mosaic. Generally, alignment quality is tested by computing the magnitude of the normal flow field between the inspection and reference images. Regions in the parametric surface having normal flow above a predefined threshold (e.g., 0.5) are labeled as unaligned and further processed by a subsequent processor. If these regions obtain a deminimus size, the system deems the images aligned and the next processor is not executed.

The output of the two processors are the translation parameters and the motion fields. A 3D mosaic generator 606 combines the input images with the translation parameters and motion fields to produce a 3D mosaic. As defined above, the 3D mosaic contains an image mosaic and a shape mosaic, where the image mosaic is a panoramic view of the scene represented by the images and the shape mosaic represents the three-dimensional geometry of the scene within the panoramic view.

The 3D mosaic can then be used in various extensions and applications (reference 608) of the basic system discussed above. These extensions and application of the system are discussed in detail below.

C. Extensions of the Invention

There are a number of optional processes that enhance the usefulness of the invention. The first is a pose estimation routine that provides a simple technique for relating a new image taken from a new viewpoint to an existing mosaic. The second extension is a technique for generating a new 3D mosaic by combining an existing mosaic with a new image of the scene represented by the mosaic. The third extension is a technique for detecting and processing occlusions within a 3D mosaic.

i. Pose Estimation

Figure 7:
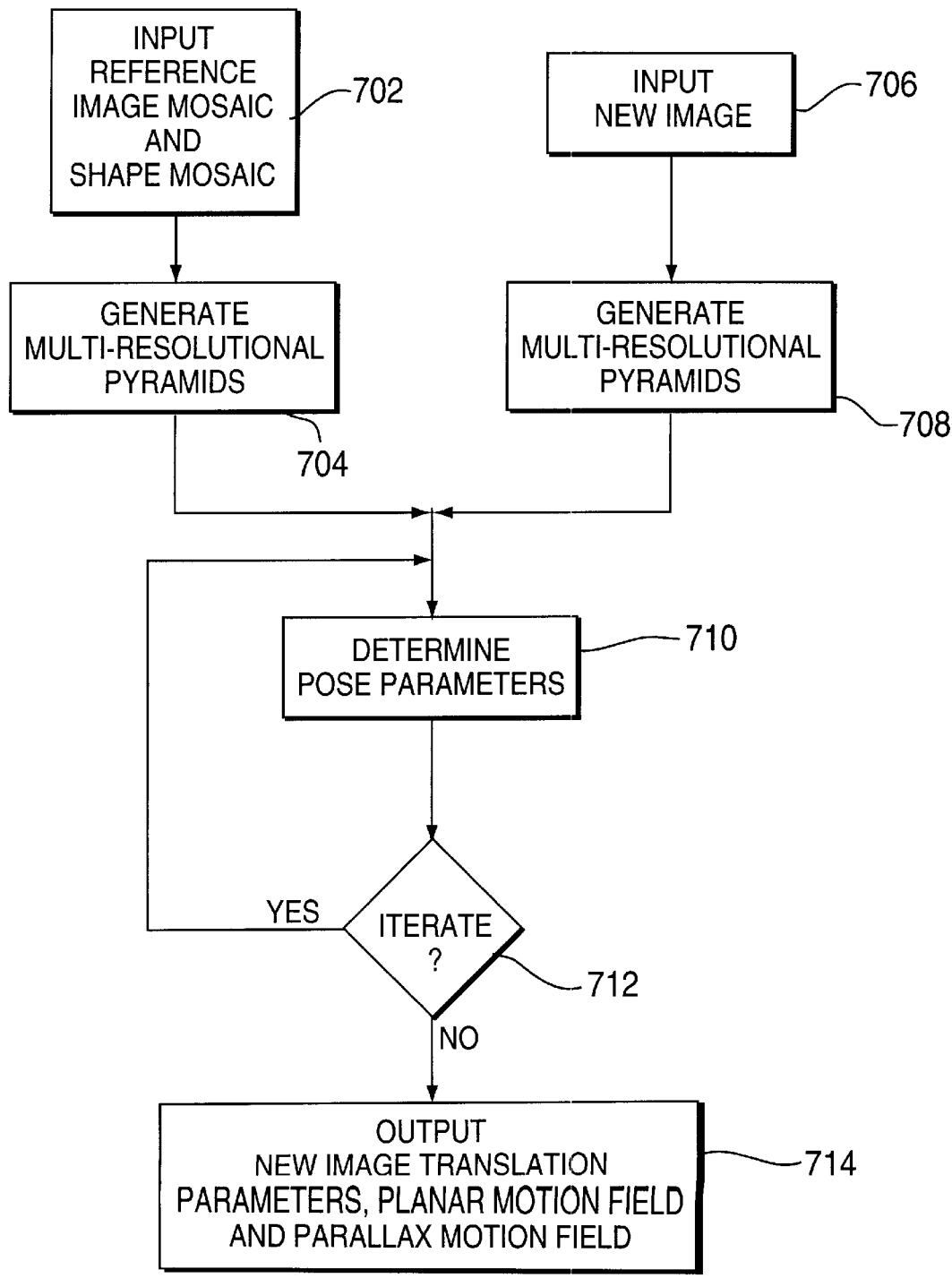
FIG. 7 is a flow chart of a pose estimation routine.

FIG. 7 is a flow chart of a pose estimation routine 700. Given both reference and inspection images, the system aligns the images and determines a parallax field using the P-then-P process and/or the P-and-P process as discussed above to form a reference image mosaic and a reference shape mosaic. The reference mosaics then serve as an initial representation of the three-dimensional scene. The reference image and shape mosaics are input at step 702 and then converted into multi-resolutional pyramids at step 704. If the reference mosaics are provided as pyramids, then step 704 can be disregarded. Given a new image of the scene taken from a new viewpoint (step 706) that has been converted into an image pyramid at step 708, the routine computes, at step 710, the pose of the new viewpoint with respect to the reference view used to construct the reference mosaics. The pose of the new image is represented by eleven pose parameters; namely, eight planar motion parameters ($p_1$, through $p_8$) and three translation parameters ($T_{2(x,y,z)}$). To compute the pose parameters, the system again uses the direct hierarchical technique used above to register the images, and iterated through step 712 until the SSD achieves a predefined value. Specifically, given the parallax field γ, Equation 8 is minimized using Equation 3 to estimate the eleven pose parameters. As with the registration approaches described above, the new image is aligned using the coarse-to-fine registration process over an image pyramid of both the 3D representation of the scene and the new image. The outcome of the pose estimation routine are translation parameters, a planar motion field, and a parallax motion field for the new image. With these results, the new image can be integrated into the 3D mosaic as discussed below.

ii. 3D Corrected Mosaic Generation

Given a reference 3D mosaic (e.g., an existing mosaic) relating a plurality of images of a scene to one another and using pose estimation, the system can update the existing mosaic with new image information as it becomes available. This process of integrating information from new images into an existing mosaic is known as correcting the 3D mosaic.

As discussed above 3D mosaics contain two parts; namely, a mosaic image representing an assemblage of the various images of a scene into a single (real or virtual) camera view, and a parallax map (shape mosaic) corresponding to that view. Note that the parallax map is itself a mosaic produced by arranging the parallax maps relating various images to one another. To construct a 3D corrected mosaic, a new image is registered with the existing mosaic and then the new image information is merged into the existing mosaic. The merged image and mosaic become a corrected mosaic that then becomes the existing mosaic for the next new image.

Figure 8:
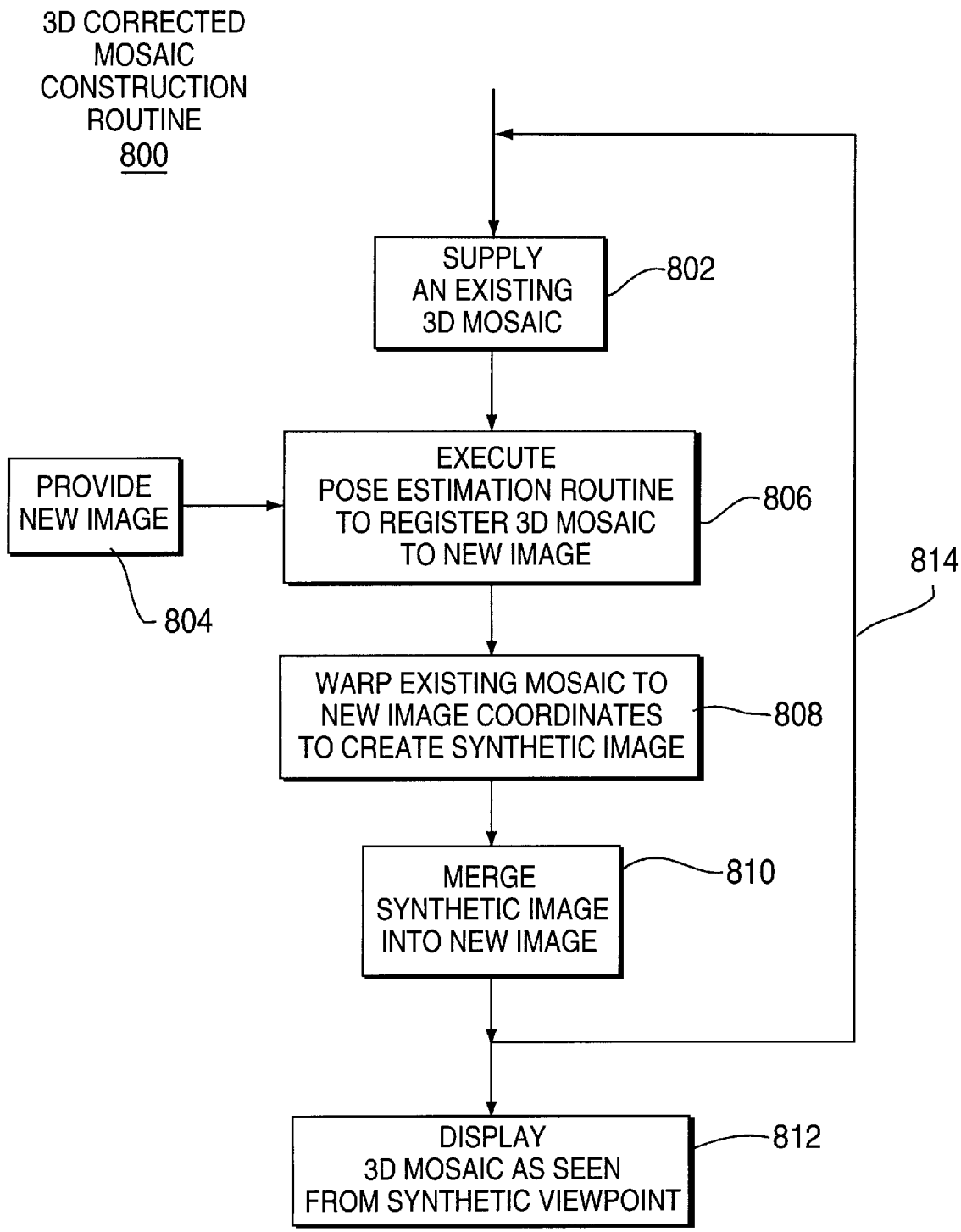
FIG. 8 is a flow chart of a three-dimensional corrected mosaic construction routine.

FIG. 8 depicts a flow chart of a routine 800 for constructing 3D corrected mosaics. At step 802, the system is supplied an existing 3D mosaic, then the mosaic assembly process proceeds as follows.

1. At step 804, a camera provides a new image of the scene represented in the existing mosaic. The new image is taken from a new viewpoint of the scene.

2. At step 806, the routine uses the pose estimation process to compute the eleven pose parameters that register the existing mosaic to the new image.

3. At step 868, the routine creates a synthetic image taken from the new viewpoint by reprojecting the existing image mosaic using the estimated pose parameters. The reprojection is accomplished by forward warping the existing image mosaic using Equation 3. To avoid generating any holes in the synthetic image arising from forward image warping, the routine conventionally super-samples the second image as described in Wolberg, Digital Image Warping, IEEE Computer Society Press, Los Alamitos, Calif. (1990). The reprojection must also be sensitive to occlusion within the image. Occlusion detection and processing is described below.

It should be noted that the new image can also be registered to the existing image mosaic and then the new image warped to the existing image mosaic. However, to accomplish this warping, parallax information concerning the new image is needed to accurately warp the new image and capture the three-dimensional geometry of the scene. To generate the necessary parallax information, either the previous image merged into the mosaic is temporarily stored in memory and used as a reference image to generate the parallax information with respect to the new image, or two new images and there respective parallax field is provided at step 804. In either instance, if the new image is to be warped to the mosaic, the new image must be provided with a parallax field. This is not necessary when the existing mosaic is warped to the new image. FIG. 8 only depicts the process for warping the mosaic to the image.

4. At step 810, the routine merges the synthetic image into the new image to create a new mosaic. This new mosaic is supplied along path 814 as the existing mosaic. The synthetic image contains image regions not present in the new image. These new regions are added to the new image and extend its boundaries to create the new 3D mosaic. Note, in the merging process, to achieve a smooth mosaic construction, the routine can temporally average the intensities of common regions in the synthetic image and the new image.

To construct the shape mosaic for the new viewpoint, the system forward warps the existing shape mosaic to the new image coordinate system in much the same way as the existing image mosaic was reprojected. Given the pose parameters between the existing image mosaic and the new image, the shape mosaic of those portions of the existing 3D mosaic not visible in new image, but only visible in existing mosaic can also be estimated. The reprojected shape mosaic is merged with this additional parallax information to complete the 3D mosaic as viewed from the new viewpoint.

5. At step 812, the routine displays the corrected 3D mosaic as seen from the new viewpoint. As such, new image information is accurately incorporated into an existing 3D mosaic.

iii. Occlusion Detection and Processing

Figure 9:
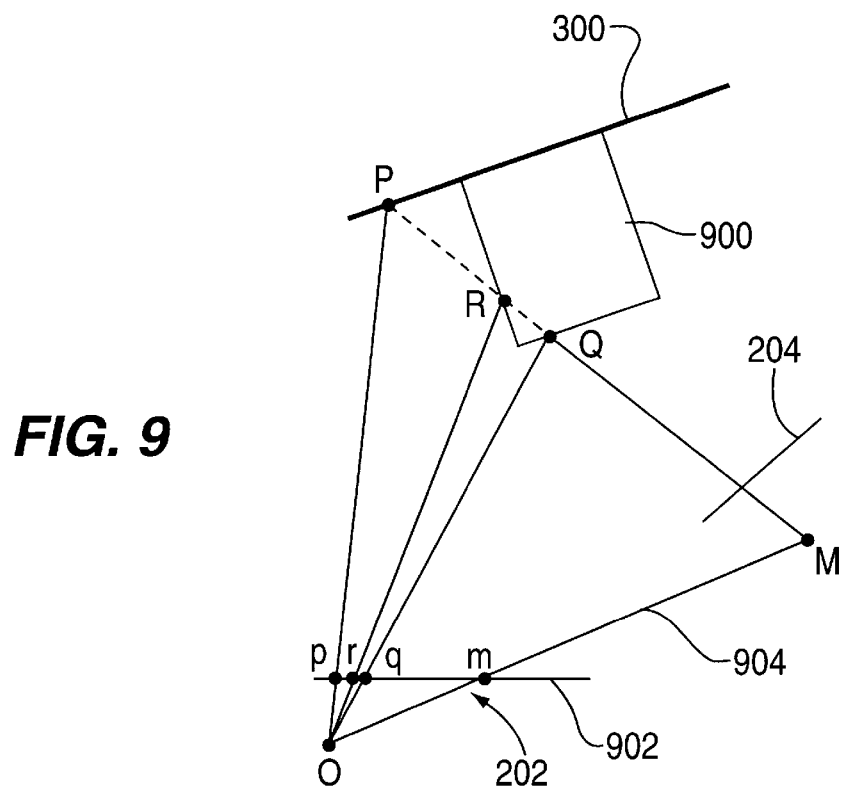
FIG. 9 is a two-dimensional geometric representation of the plane OMP of FIG. 3 where the scene contains an object that occludes points within the image.

Due to occlusion, in creation of the synthetic image (as detailed above) more than one image point in the second image may project to the same point in the synthetic image. As shown in FIG. 9 points P, Q and R all project to the same point the inspection image 304. If the depth of each point relative to inspection image 304 were known, then it would be known that points P and Q are occluded by point R. In other words, from the viewpoint of the inspection camera, the points P and Q are occluded by the corner of the box 900. However, the parallax map does not contain the necessary information to deduce the relative depth of each point. Nonetheless, the relative depth information can be derived from the relative locations of the image points p, q, and r in the reference image 302. These points in image 302 must lie in an epipolar line 902 within the image. By connecting the focal points O and M of each image (camera) with a line 904, an epipole m is defined on line 902. Given that focal point M is nearer the scene than focal point M, the order of the points from point m on line 902 identifies the occluded points. In this example, point r proceeds points p and q and, as such, point R occludes points P and Q. If, however, focal point O is nearer to the scene than focal point M, then the ordering of the occluded points is reversed and the occluded points are nearest to point m on line 902. The system uses this relatively simple technique for determining occluded points within an image. Once recognized, the occluded points can be deleted from the image, filtered, or otherwise processed such that potential artifacts generated by the occluded points are avoided.

D. Applications for 3D Mosaics

The foregoing description discussed the image processing system used to combine at least two images into a single 3D mosaic. Such a dynamic system for representing video information has many applications, some of which are discussed below.

i. Object Height Estimation

In general, parallax flow vectors vary directly with height and inversely with depth, where depth is the distance of an object from the camera. As such, 3D mosaics generated from aerial views of objects on the ground can be used to estimate the height of the objects above the earth's surface. To eliminate depth and estimate object height from the parametric surface (the earth's surface), the inventive system is adapted to use a characteristic property of aerial view images (hereinafter referred to as an aerial view property). Specifically, the depth from a camera to an object is typically much greater than the height of the object from the ground. In nadir aerial images, the depth of all points is approximately the same so that a weak perspective projection can be used to estimate object height. Whereas, in an oblique view, there can be considerable depth variation across a given image. However, for any single point in an oblique aerial image, the depth of that image point is approximately the same depth of a virtual 3D point obtained by extending a line of sight ray from the camera and intersecting it with the ground plane. Therefore, the system can factor out the depth in the parallax Equations 4 and 5 by estimating an equation of for ground plane.

This specific application for the inventive image processing system uses the magnitude of the displacement vectors to infer the magnitude of the height and the direction of the flow vectors to infer the sign of the height. The sign of the height indicates whether the point is above or below the plane. For the sequential approach, the magnitude of the displacement vector $\gamma_2 = \sqrt{(x_w - x_1)^2 + (y_w - y_1)^2}$ for the case where the translation is parallel to the image plane is given by Equation 9.

$$\gamma_2 = \frac{fH}{P_z T_\perp} \sqrt{T_{1\perp}^2 + T_{1y}^2} \tag{9}$$

The magnitude of the displacement vector for the case where $T_{1z} \neq 0$ is given by Equation 10.

$$\gamma_2 = \frac{T_{1z} H}{P_z T_\perp} \gamma_F \tag{10}$$

where $\gamma_F = \sqrt{(x_w - x_F)^2 + (y_w - y_F)^2}$ is the distance of the point $(x_w, y_F)$ from the focus of expansion (FOE).

Since $$N_2^T \vec{p}_1 = \frac{f}{P_z},$$

using the aerial view property equations 9 and 10 can be reduced to Equation 11.

$$I = S_2 H N_2^T \vec{p}_1 \tag{11}$$

where $I = \gamma_2/\gamma_F$ is a measurement obtained from the alignment parameters and the estimated parallax vector and S is a proportionately factor that depends upon the translation vector $T_1$ and the distance $T_{2\perp}$. Equation 11 can be rewritten as Equation 12 to solve for the height H of any image point in a scene.

$$H = \frac{I}{(K_1 x + K_2 y + K_3)} \tag{12}$$

where $\vec{k}$ is an unknown vector having components $K_1 = SN_{2x}$, $K_2 = SN_{2x}$ and $K_3 = fSN_{2x}$.

To best utilize the height estimation computation, the intrinsic camera parameters such as focal length and image center should be determined using standard techniques. However, in some applications, it is not possible to calibrate the camera parameters nor obtain these parameters apriori. As such, a number of alternative estimation methods have been developed to estimate height when either the focal length and/or image center are known or unknown.

If the focal length and center are both unknown and height of at least three points are known (reference points), then Equation 12 can be solved to linearly estimate vector $\vec{K}$.

If focal length and camera center are both known, a normal plane is inferred using Equation 12. This equation related the quadratic registration parameters to the translation, rotation and normal of the plane, but the translation direction is computed during the quasi-parametric residual estimation. The translation direction together with Equation 10 provides a linear set of eight equations containing six unknowns; namely, normal vector N and rotation vector $\Omega$. Since the translation used in Equation 9 is $T_2$, while the translation computed for the parallax flow vectors is $T_1$, the quadratic transformation defined by parameters $p_1$ through $p_8$ is inverted. Alternatively, the inverse quadratic transformation can be directly estimated by inter-changing the two images during parallax vector estimation. The translation vector is determined up to a pre-defined scaling factor. As such, the height of at least one point is needed to determine the height of each other point in the 3D mosaic or any constituent image (real or virtual).

To determine the height of image points when focal length is unknown and image center is known, Equation 12 is solved using the known height of two points in the scene. Since focal length is unknown, it is not possible to utilize all eight parameters given by Equation 8. However, the linear parameters $p_1$ through $p_4$ do not depend on the focal length and, as such, Equation 10 pertaining to these parameters can be used. On inspecting these equations, when $T_z = 0$, the normal component $N_z$ cannot be determined. However, the components $N_x$ and $N_y$ can be determined up to a scaling factor. Since the focal length is unknown, this result is also true for the case when $T_z \neq 0$. As such the translation vector is a scaled version of the vector $[fT_x, fT_y, T_z]$. Therefore, whether $T_z$ is zero or not, the method is capable of determining at least one component of the vector N and subsequently the vector K. The method uses the height of at least two image points and Equation 12 to determine vector K and the height of any point in the mosaic.

Figure 10:
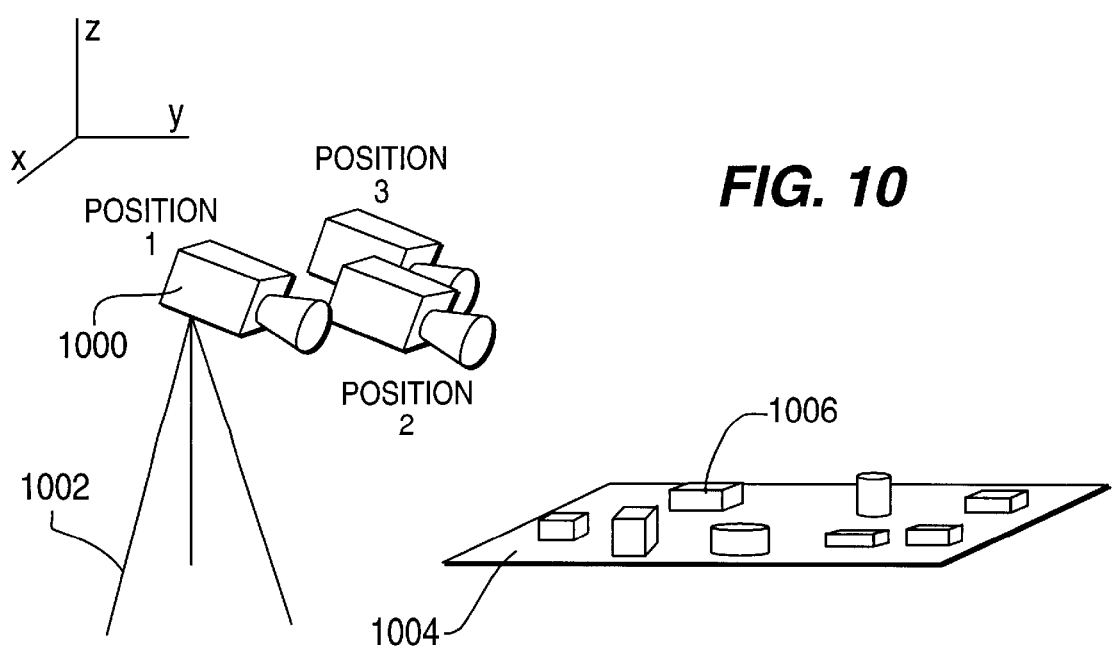
FIG. 10 depicts an experimental set-up for estimating heights of objects within a scene using the system of the present invention.

The foregoing technique has been used experimentally to determine the height of a number of objects lying upon a plane (ground plane). FIG. 10 schematically depicts the experimental set-up. Specifically, a camera 1000 was mounted on a tripod 1002 proximate to a flat plane 1004 upon which various shaped objects 1006 were placed. The objects ranged in height from 1 inch to 4.9 inches above the plane. Initially, an image was taken with the camera at an angle of 35 degrees from horizontal and approximately 69 inches above the plane, i.e., position 1. Next, the camera was moved forward in the y-z plane by approximately 4 inches to position 2. At position 2, a second image was captured. The foregoing height estimation technique was used to register the image from position 2 (inspection image) to that of the image taken at position 1 (reference image) and then determine the heights of the various objects. Without knowing the focal length and camera center and knowing the height of three points, the method determined the height of the entire scene. When compared to the actual height of each object, the largest standard deviation for the estimated height was 0.2 inches.

In a second experiment, the inspection image was generated by moving the camera to position 3, e.g., approximately 4 inches laterally along the x axis from position 1. The method was again used to register the images and generate a height map. The result of this experiment showed a largest standard deviation of 0.27 inches.

The full extent of the experiments is published in Kumar et al., "Shape Recovery From Multiple Views: A Parallax Based Approach", Proceedings ARPA Image Workshop, November 1994, Monterey, Calif.

The foregoing height estimation processes were discussed in the context of three scenarios; namely, (1) when no camera information is known, (2) when camera focal length is known and camera center is unknown (or vice versa), and (3) when both camera center and focal length are known. In the third scenario, the assumption regarding the aerial view property is not relevant and is not assumed. In the first and second scenarios, the assumption was used Nonetheless, the foregoing equations can be slightly modified to avoid using this assumption to solve for the height.

The foregoing technique used to find object height within a mosaic of two images can be extended to determine height information in mosaics comprised of more than two images. The multiframe technique uses a batch method that registers all the images to a single reference image and a single reference plane that extends through all the images. Once all the images are aligned along the plane, the method computes the residual parallax displacement vectors between each pair of image frames. The height map is inferred from the sequence of estimated residual parallax displacement vectors.

To accomplish this computation, Equation 11 is rewritten as Equation 13.

$$\frac{I_i}{S_i} = H(K_1 x + K_2 y + K_3) \tag{13}$$

Where $I_i$ and $S_i$ each vary from frame to frame, while the right-hand side of the equation is constant over the entire image sequence. As such, the ratio of $I_i$ and $S_i$ is an invariant quantity across the mosaic.

For a sequence of N inspection frames and given the height of three image points relative to the image plane, the method solves 3N linear equations containing N+3 unknown values; namely, N $S_i$ terms and the vector K. First the method finds a solution for the N+3 unknown values and then uses the values to solve Equation 13 to estimate the height of other points in the mosaic. If the focal length and/or image center is known, then the equations can be solved using only one or two known image height values.

The image height computation can be combined with the 3D corrected mosaic routine to produce topographic mapping information. For example, the foregoing height estimation system is used to produce a height map of terrain, and the 3D corrected mosaic routine uses the same images generated used to generate the height map to produce a 3D corrected mosaic. Thereafter, a new view, e.g., perpendicular to the terrain, can be synthesized and the height map can be corrected (altered to conform to the new view). As such, the height map can be generated from any arbitrary viewpoint of the scene. Consequently, images that are captured at an oblique angle of a scene can be converted into an image of the scene from an orthogonal viewpoint and height information can be generated from that new viewpoint.

ii. Synthetic View Generation (Tweening)

Generally speaking, given an existing 3D mosaic representing a three-dimensional scene and the pose of a new viewpoint with respect to that mosaic, the system can derive a synthetic image of the scene. As such, by capturing a scene using different cameras having different viewpoints of the scene, the system can synthesize images that are a view of the scene from viewpoints other than those of the cameras.

Figure 11:
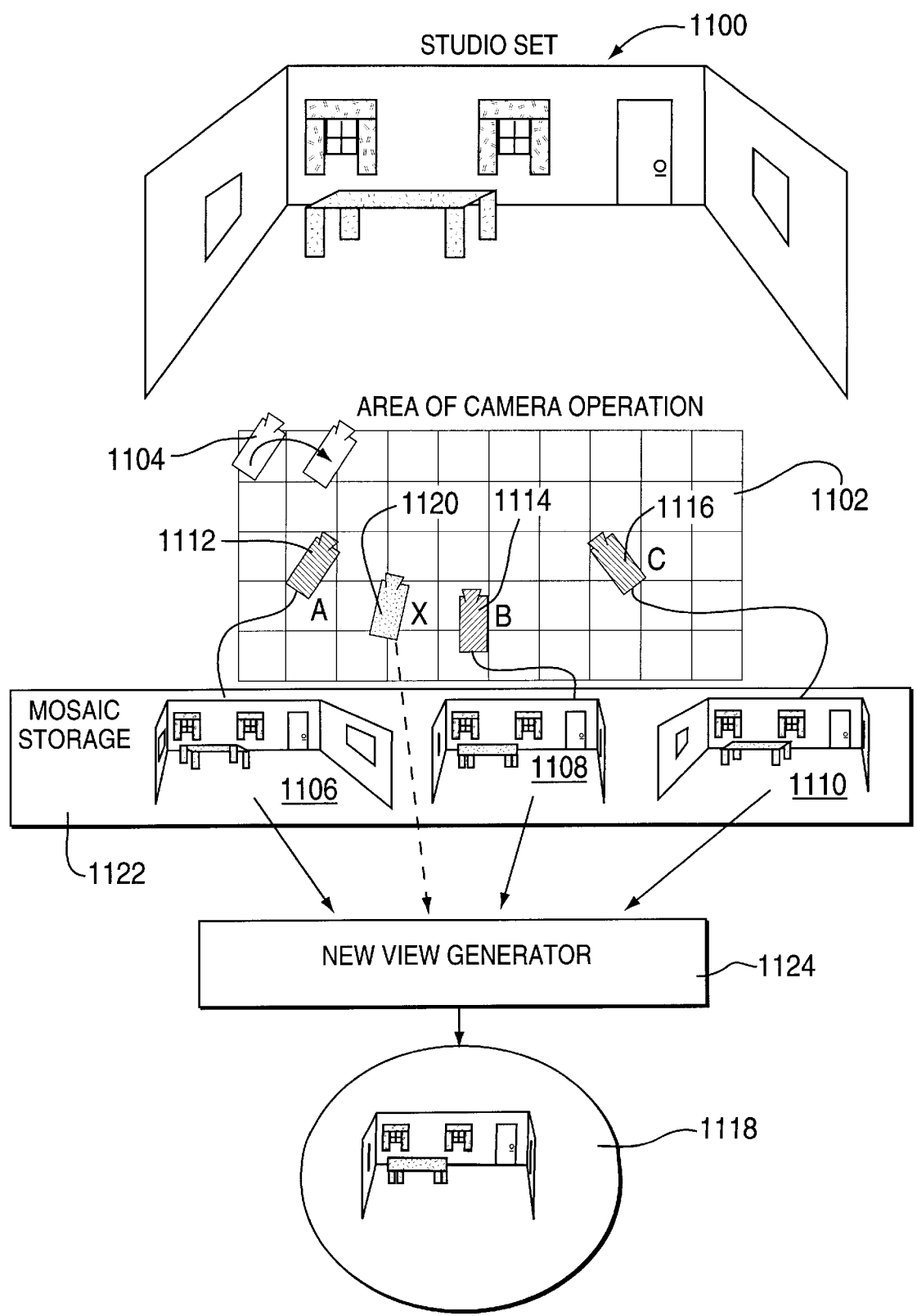
FIG. 11 depicts a block diagram of an application for the inventive system that synthesizes a new view of existing three-dimensional mosaics.

FIG. 11 depicts a hardware arrangement of camera(s) within a three-dimensional studio 1100 used to generate a 3D mosaic representation of the studio. The studio is merely illustrative of one type of three-dimensional scene that can be recorded by the system. It, of course, can be replaced with any three-dimensional scene. The 3D mosaic generation process, as discussed above, uses a plurality of images of the scene to produce one or more mosaics representing the scene. As such, a two dimensional grid 1102, defining a plurality of one foot by one foot squares, is used to define camera positions within an area proximate to the studio. In general, the specific size of the grid squares, i.e., the number of camera positions, will vary depending upon the complexity of the scene. Also, the shape of the grid will vary depending upon the type of scene being recorded, e.g., some scenes, such as a sporting event, may be circumscribed by the grid.

To produce the images for the mosaic(s), a camera 1104 records an image (or a series of images, e.g., video) from each of the grid squares. The images are typically recorded at various camera pan, tilt, rotate and zoom positions for each grid square to generate the plurality of images from a plurality of viewpoints. The image processing system described above generates a 3D mosaic from the various images recorded at each camera location. Similarly, 3D mosaics are generated for the other camera locations at each of the grid points. For example, 3D mosaics 1106, 1108, 1110 (only the image mosaic portion is depicted) represent the scene as recorded from grid locations 1112, 1114, and 1116. These 3D mosaics are merged to generate a synthetic image 1118 representing the scene as viewed from, for example, location 1120. The image generated at the synthetic viewpoint is not a "real" camera viewpoint, but rather is synthesized from information contained in the various mosaics.

The system of the present invention generates the synthetic image using one of two processes. The first process used to generate a synthetic image view of the scene, warps each of the individual mosaics (e.g., mosaics 1106, 1108, and 1110) to the location of the synthetic viewpoint (e.g., location 1120). Thus, as each 3D mosaic is generated for each grid point, the 3D mosaic is stored in memory (mosaic storage 1122) with respective to its associated grid point. Given a new viewpoint location, the mosaics are recalled from memory to generate a synthetic image representing the scene from the new viewpoint. Depending upon the complexity of the scene being imaged, the system may recall each of the 3D mosaics in memory or some subset of those mosaics, e.g., only recall those mosaics that are nearest the new view location. Using new view generator 1124, each recalled 3D mosaic is warped to the new viewpoint location (e.g., location 1120) and the mosaics are merged to form the new view image 1118. Image merging is typically accomplished by averaging the pixels of the various mosaics used to form the new view image. However, other forms of image merging are known in the art and can be applied to these 3D mosaics. The result generated by the new view generator is a new view (e.g., image 1118) of the scene 1100.

The second process warps each camera view 3D mosaic to the location of a previously generated 3D mosaic. Illustratively, the 3D mosaic 1106 from camera location 1112 is produced first, the mosaic 1108 produced from camera location 1114 is then warped to the coordinate system of location 1112, and lastly, the mosaic 1110 produced by camera 1118 is warped to the coordinate system of location 1112. As such, a composite 3D mosaic of the scene (not specifically shown) is generated by combining (merging) the various 3D mosaics as viewed from a reference coordinate system (e.g., location 1112). Of course, any coordinate system can be used as the reference coordinate system. Also, depending upon the scene being imaged, less than all the 3D mosaics generated at each grid point may be used to produce the composite mosaic. Thereafter, any synthetic view of the scene can be produced by warping the composite 3D mosaic to the coordinate system of the synthetic view, e.g., location 1120. The result is a new view (image 1118) of the scene.

iii. Scene Change Detection

The system of the present invention can be used to monitor a scene through a moving imaging device (e.g., camera) and detect changes in the scene. The system corrects for changes that are due to parallax and viewpoint changes and, therefore, is less sensitive to false scene changes than prior art systems.

Specifically, the system detects change by combining a sequence of images to form a three-dimensional mosaic (or a corrected 3D mosaic). For any image in the sequence of images, or for any new images that are to be added to the 3D mosaic, the system compares the selected image to both a previous and a next image in the sequence using the PthenP process, the P-and-P process, or pose estimation. The "final" areas of change that represent "real" moving objects are those that appear in both the comparisons to the previous and next images. The system deems all other areas of change to be due to viewpoint changes, i.e., parallax. This simple heuristic operates quite well in eliminating many areas of change which are viewpoint dependent such as specularities and occlusions.

iv. Other applications 3D mosaics can be used in applications where 2D mosaics presently find use. Specifically, since image redundancy is removed by combining sequences of images into mosaics, mosaics find use in video transmission, video storage and retrieval, and video analysis and manipulation. By using mosaics, less video data need be transmitted, stored, or analyzed. As such, the 3D mosaics generated by the system of the present invention will find use in many applications where image information needs to be efficiently manipulated, stored, and/or transmitted.

Although various embodiments which incorporate the teachings of the present invention have been shown and described in detail herein, those skilled in the art can readily devise many other varied embodiments that still incorporate these teachings.

What is claimed is:

1. A method of processing a plurality of images to generate a three-dimensional mosaic of a scene comprising the steps of:
   providing a plurality of images of the scene; and
   registering said images along a non-planar parametric surface to construct said three-dimensional mosaic containing an image mosaic of registered images and a shape mosaic, where said image mosaic represents a panoramic view of the scene and said shape mosaic represents a three-dimensional geometry of the scene.

2. The method of claim 1 wherein said registering step further comprises the steps of:
   registering each image in said plurality of images along said non-planar parametric surface to produce registered images;
   determining, in response to said registered images, translation parameters and a parametric motion field useful in aligning the images along the non-planar parametric surface; and
   generating a parallax field representing parallax of objects within the scene.

3. The method of claim 2 further comprising the step of converting said plurality of images into a plurality of multi-resolutional pyramids, where each image pyramid contains a plurality of levels.

4. The method of claim 3 wherein said registering and determining steps are iterated over each of said levels within said multi-resolutional pyramids until said plurality of images are registered to a predefined degree of accuracy.

5. The method of claim 4 wherein said predefined degree of accuracy is a sum of the squares difference measure integrated over selected regions within each of said levels of said multi-resolutional pyramids.

6. The method of claim 1 wherein said shape mosaic contains a parallax motion field.

7. The method of claim 1 wherein said image mosaic and said shape mosaic are multi-resolutional pyramids.

8. The method of claim 1 further comprising the steps of:
   converting said image mosaic and said shape mosaic into multi-resolutional pyramids;
   converting a new image into a multi-resolutional pyramid; and
   determining pose parameters for relating the new image with the image mosaic and the shape mosaic, where the pose parameters contain translation parameters, a planar motion field, and a parallax motion field for the new image.

9. The method of claim 8 further comprising the step of generating a updated image mosaic and an updated shape mosaic, each containing the new image and the pose parameters.

10. The method of claim 8 further comprising the steps of:
    providing an existing three-dimensional mosaic;
    determining pose parameters for a new image with respect to said existing three-dimensional mosaic;
    warping said existing three-dimensional mosaic to image coordinates of said new image to create a synthetic image, where said synthetic image represents a view of the three-dimensional mosaic from the coordinates of the new image; and
    merging said synthetic image into said new image to produce a new three-dimensional mosaic that is a combination of said new image and said existing three-dimensional mosaic.

11. The method of claim 10 further comprising the steps of:
    providing a next image that sequentially follows said new image;
    detecting changes between said new image, said existing three-dimensional mosaic, and said next image, where said changes represent motion within the scene without detecting parallax due to viewpoint change as said motion.

12. The method of claim 1 further comprising the steps of:
    detecting points within said three-dimensional mosaic that are occluded within the scene by objects in the scene; and
    image processing the detected occluded points such that said occluded points do not produce artifacts in said three-dimensional mosaic.

13. The method of claim 1 further comprising the step of:
    estimating a height of points within said three-dimensional mosaic relative to said parametric surface, where said height of said points form a height map that represents the height of object points within said scene.

14. The method of claim 1 further comprising the steps of:
providing a plurality of three-dimensional mosaics representing a scene from different viewpoints, where a three-dimensional mosaic has been generated at each viewpoint;
warping said plurality of three-dimensional mosaics to a reference coordinate system;
merging said plurality of three-dimensional mosaics to form a composite three-dimensional mosaic;
providing coordinates for a new viewpoint of said scene;
determining parameters to relate said new viewpoint coordinates to said composite three-dimensional mosaic; and
warping said composite three-dimensional mosaic to said viewpoint coordinates to create a synthetic image, where said synthetic image represents a new view of the composite three-dimensional mosaic taken from the new viewpoint.

15. The method of claim 1 further comprising the steps of:
providing a plurality of three-dimensional mosaics representing a scene from different viewpoints, where a three-dimensional mosaic has been generated at each viewpoint;
providing coordinates for a new viewpoint of said scene;
determining parameters to relate said new viewpoint coordinates to a plurality of the three-dimensional mosaics;
warping said plurality of three-dimensional mosaics to said viewpoint coordinates to create a synthetic image, where said synthetic image represents a new view of the three-dimensional mosaic taken from the new viewpoint; and
merging said plurality of three-dimensional mosaics to form said synthetic image.

16. The method of claim 1 wherein said registering step further comprises the steps of:
performing a plane-then-parallax process including the steps of registering each image in said plurality of images along a parametric surface to produce initially registered images; determining, in response to said initially registered images, initial translation parameters and a initial parametric motion field useful in initially aligning the images along the parametric surface; and generating an initial parallax field representing parallax of objects within the scene; and
simultaneously registering, using said initial translation parameters, initial parametric motion field and initial parallax field, said images in said plurality of images along said parametric surface to produce final registered images, determining, in response to said final registered images, final translation parameters and a final parametric motion field useful in aligning the images along the parametric surface, and generating a final parallax field representing parallax of objects within the scene.

17. The method of claim 16 further comprising the step of converting said plurality of images into a plurality of multi-resolutional pyramids, where each multi-resolutional pyramid contains a plurality of levels.

18. The method of claim 17 wherein said registering, determining and simultaneously registering steps are iterated over each of said levels within said multi-resolutional pyramids until said plurality of images are registered to a predefined degree of accuracy.

19. The method of claim 18 wherein said predefined degree of accuracy is a sum of the squares difference measure integrated over selected regions within each of said levels of said multi-resolutional pyramids.

20. The method of claim 16 wherein said image mosaic and said shape mosaic are multi-resolutional pyramids.

21. A method of processing a plurality of images to generate a three-dimensional mosaic of a scene comprising the steps of:
providing a plurality of images of the scene;
simultaneously registering said images in said plurality of images along a parametric surface to produce registered images, determining, in response to said registered images, translation parameters and a parametric motion field useful in aligning the images along the parametric surface, and generating a parallax field representing parallax of objects not lying within said parametric surface.

22. The method of claim 21 further comprising the step of converting said plurality of images into a plurality of multi-resolutional pyramids, where each multi-resolutional pyramid contains a plurality of levels.

23. The method of claim 22 wherein said registering and determining steps are iterated over each of said levels within said multi-resolutional pyramids until said plurality of images are registered to a predefined degree of accuracy.

24. The method of claim 23 wherein said predefined degree of accuracy is a sum of the squares difference measure integrated over selected regions within each of said levels of said image pyramids.

25. The method of claim 21 further comprising the steps of:
converting said image mosaic and said shape mosaic into multi-resolutional pyramids;
converting a new image into a multi-resolutional pyramid; and
determining pose parameters for relating the new image with the image mosaic and the shape mosaic, where the pose parameters contain translation parameters, a planar motion field, and a parallax motion field for the new image.

26. The method of claim 25 further comprising the step of generating a updated image mosaic and an updated shape mosaic, each containing the new image and the pose parameters.

27. The method of claim 25 further comprising the steps of:
providing an existing three-dimensional mosaic;
determining pose parameters for a new image with respect to said existing three-dimensional mosaic;
warping said existing three-dimensional mosaic to image coordinates of said new image to create a synthetic image, where said synthetic image represents a view of the three-dimensional mosaic from the coordinates of the new image; and
merging said synthetic image into said new image to produce a new three-dimensional mosaic that is a combination of said new image and said existing three-dimensional mosaic.

28. The method of claim 27 further comprising the steps of:
providing a next image that sequentially follows said new image;
detecting changes between said new image, said existing three-dimensional mosaic, and said next image, where said changes represent motion within the scene without detecting parallax due to viewpoint change as said motion.

29. The method of claim 21 further comprising the steps of:
   detecting points within said three-dimensional mosaic that are occluded within the scene by objects in the scene; and
   image processing the detected occluded points such that said occluded points do not produce artifacts in said three-dimensional mosaic.

30. The method of claim 21 further comprising the step of:
   estimating a height of points within said three-dimensional mosaic relative to said parametric surface, where said height of said points form a height map that represents the height of object points within said scene.

31. The method of claim 21 further comprising the steps of:
   providing a plurality of three-dimensional mosaics representing a scene from different viewpoints, where a three-dimensional mosaic has been generated at each viewpoint;
   warping said plurality of three-dimensional mosaics to a reference coordinate system;
   merging said plurality of three-dimensional mosaics to form a composite three-dimensional mosaic;
   providing coordinates for a new viewpoint of said scene;
   determining parameters to relate said new viewpoint coordinates to said composite three-dimensional mosaic; and
   warping said composite three-dimensional mosaic to said viewpoint coordinates to create a synthetic image, where said synthetic image represents a new view of the composite three-dimensional mosaic taken from the new viewpoint.

32. The method of claim 21 further comprising the steps of:
   providing a plurality of three-dimensional mosaics representing a scene from different viewpoints, where a three-dimensional mosaic has been generated at each viewpoint;
   providing coordinates for a new viewpoint of said scene;
   determining parameters to relate said new viewpoint coordinates to a plurality of the three-dimensional mosaics;
   warping said plurality of three-dimensional mosaics to said viewpoint coordinates to create a synthetic image, where said synthetic image represents a new view of the three-dimensional mosaic taken from the new viewpoint; and
   merging said plurality of three-dimensional mosaics to form said synthetic image.

33. The method of claim 21 wherein said registering step further comprises the steps of:
   performing a plane-then-parallax process including the steps of registering each image in said plurality of images along a parametric surface to produce initially registered images; determining, in response to said initially registered images, initial translation parameters and a initial parametric motion field useful in initially aligning the images along the parametric surface; and generating an initial parallax field representing parallax of objects within the scene; and
   simultaneously registering, using said initial translation parameters, initial parametric motion field and initial parallax field, said images in said plurality of images along said parametric surface to produce final registered images, determining, in response to said final registered images, final translation parameters and a final parametric motion field useful in aligning the images along the parametric surface, and generating a final parallax field representing parallax of objects within the scene.

34. The method of claim 33 further comprising the step of converting said plurality of images into a plurality of multi-resolutional pyramids, where each multi-resolutional pyramid contains a plurality of levels.

35. The method of claim 34 wherein said registering, determining and simultaneously registering steps are iterated over each of said levels within said multi-resolutional pyramids until said plurality of images are registered to a predefined degree of accuracy.

36. The method of claim 35 wherein said predefined degree of accuracy is a sum of the squares difference measure integrated over selected regions within each of said levels of said multi-resolutional pyramids.

37. The method of claim 34 wherein said image mosaic and said shape mosaic are multi-resolutional pyramids.

38. A method of processing a plurality of images to generate a three-dimensional mosaic of a scene comprising the steps of:
   providing a plurality of images of the scene;
   registering each image in said plurality of images along a non-planar parametric surface to produce registered images; and
   determining, in response to said registered images, translation parameters and a parametric motion field useful in aligning the images along the non-planar parametric surface; and
   generating a parallax field representing parallax of objects within the scene;
   constructing, in response to said translation parameters, parametric motion field, and said parallax field, said three-dimensional mosaic containing an image mosaic and a shape mosaic, where said image mosaic represents a panoramic view of the scene and said shape mosaic represents a three-dimensional geometry of the scene.

39. The method of claim 38 further comprising the step of converting said plurality of images into a plurality of multi-resolutional pyramids, where each multi-resolutional pyramid contains a plurality of levels.

40. The method of claim 39 wherein said registering and determining steps are iterated over each of said levels within said multi-resolutional pyramids until said plurality of images are registered to a predefined degree of accuracy.

41. The method of claim 40 wherein said predefined degree of accuracy is a sum of the squares difference measure integrated over selected regions within each of said levels of said multi-resolutional pyramids.

42. The method of claim 41 wherein said shape mosaic contains a parametric motion field and a parallax motion field.

43. The method of claim 38 wherein said image mosaic and said shape mosaic are multi-resolutional pyramids.

44. A method of processing a plurality of images to generate a three-dimensional mosaic of a scene comprising the steps of:
   providing a plurality of images of the scene;
   simultaneously registering said images in said plurality of images along a parametric surface to produce registered images, determining, in response to said registered images, translation parameters and a parametric motion field useful in aligning the images along the parametric surface, and generating a parallax field representing parallax of objects within the scene; and constructing, in response to said translation parameters, parametric motion field, and said parallax field, said three-dimensional mosaic containing an image mosaic and a shape mosaic, where said image mosaic represents a panoramic view of the scene and said shape mosaic represents a three-dimensional geometry of the scene.

45. The method of claim 44 further comprising the step of converting said plurality of images into a plurality of multi-resolutional pyramids, where each multi-resolutional pyramid contains a plurality of levels.

46. The method of claim 45 wherein said registering, and determining steps are iterated over each of said levels within said multi-resolutional pyramids until said plurality of images are registered to a predefined degree of accuracy.

47. The method of claim 46 wherein said predefined degree of accuracy is a sum of the squares difference measure integrated over selected regions within each of said levels of said multi-resolutionsal pyramids.

48. The method of claim 44 wherein said image mosaic and said shape mosaic are multi-resolutional pyramids.

49. An image processing system for generating a three-dimensional mosaic three-dimensional mosaic of a scene from a plurality of images of the scene, comprising:

means for storing said plurality of images;

a registration processor, connected to said storing means, for registering said images along a non-planar parametric surface to construct said three-dimensional mosaic containing an image mosaic and a shape mosaic, where said image mosaic represents a panoramic view of the scene and said shape mosaic represents a three-dimensional geometry of the scene.

50. The system of claim 49 wherein said registration processor further comprises:

a plane-then-parallax registration processor for aligning said images along said non-polar parametric surface that extends through the plurality of images to produce translation parameters and a parametric motion field used to align the images within the image mosaic Land then for determining a parallax field representing objects within the scene.

51. An image processing system for generating a three-dimensional mosaic of a scene from a plurality of images of the scene, comprising:

means for storing said plurality of images;

a plane-and-parallax registration processor for simultaneously aligning said images along a parametric surface that extends through the plurality of images to produce translation parameters and a parametric motion field used to align the images within the image mosaic and for determining a parallax field representing objects within the scene.

52. An image processing system for generating a three-dimensional mosaic of a scene from a plurality of images of the scene, comprising:

means for storing said plurality of images;

a plane-then-parallax registration processor for aligning said images along a parametric surface that extends through the plurality of images to produce initial translation parameters and an initial parametric motion field used to align the images within the image mosaic and then for determining an initial parallax field representing objects within the scene that do not lie in the parametric surface; and a plane-and-parallax registration processor, connected to an output of said plane-then-parallax registration processor, for simultaneously aligning said images along said parametric surface to produce final translation parameters and a final parametric motion field used to align the images within the image mosaic and for determining a final parallax field representing objects within the scene that do not lie in the parametric surface.

53. The system of claim 52 further comprising a three-dimensional mosaic generator, connected to said registration processor, for combining said images in said plurality of images using said final translation parameters and said final motion flow field to form said image mosaic and for generating said shape mosaic containing the final parallax field.

* * * * *